United States Patent [19] [11] 4,016,772
Clemens et al. [45] Apr. 12, 1977

[54] SPROCKET MEMBER CONFIGURATION

[75] Inventors: Donald E. Clemens, Tremont; Glenn M. Haslett, Peoria, both of Ill.

[73] Assignee: Caterpillar Tractor Co., Peoria, Ill.

[22] Filed: Sept. 22, 1975

[21] Appl. No.: 615,446

[52] U.S. Cl. .............................. 74/243 R; 74/229
[51] Int. Cl.² .................. F16H 55/30; B62D 55/08
[58] Field of Search ............... 74/243 R, 229, 462, 74/465; 305/57, 21, 13, 11

[56] References Cited
UNITED STATES PATENTS

| 715,562 | 12/1902 | Dodge | 74/243 R |
| 2,003,528 | 6/1935 | Best | 74/243 R |
| 2,259,937 | 10/1941 | Klaucke | 74/243 R |
| 2,667,792 | 2/1954 | Bendall | 74/245 R |
| 2,960,884 | 11/1960 | Hill | 74/462 |
| 2,996,338 | 8/1961 | Hill | 305/21 |
| 3,194,609 | 7/1965 | Thurlow | 305/57 |
| 3,756,091 | 9/1973 | Miller | 74/243 R |

Primary Examiner—Samuel Scott
Assistant Examiner—Allan R. Burke
Attorney, Agent, or Firm—Wegner, Stellman, McCord, Wiles & Wood

[57] ABSTRACT

An improved sprocket configuration for use in a track-type vehicle drive. The tooth configuration and tooth pocket configuration accommodate packing of the pocket and permit limited displacement of the chain without excessive wear of the chain bushings. The pocket configuration is relatively deep so as to permit a preselected amount of packing in the pocket root to minimize the chain bushing displacement. The improved tooth configuration provides a rounded topping surface avoiding bushing wear as may occur with sharp corner tooth configurations of the prior art.

10 Claims, 3 Drawing Figures

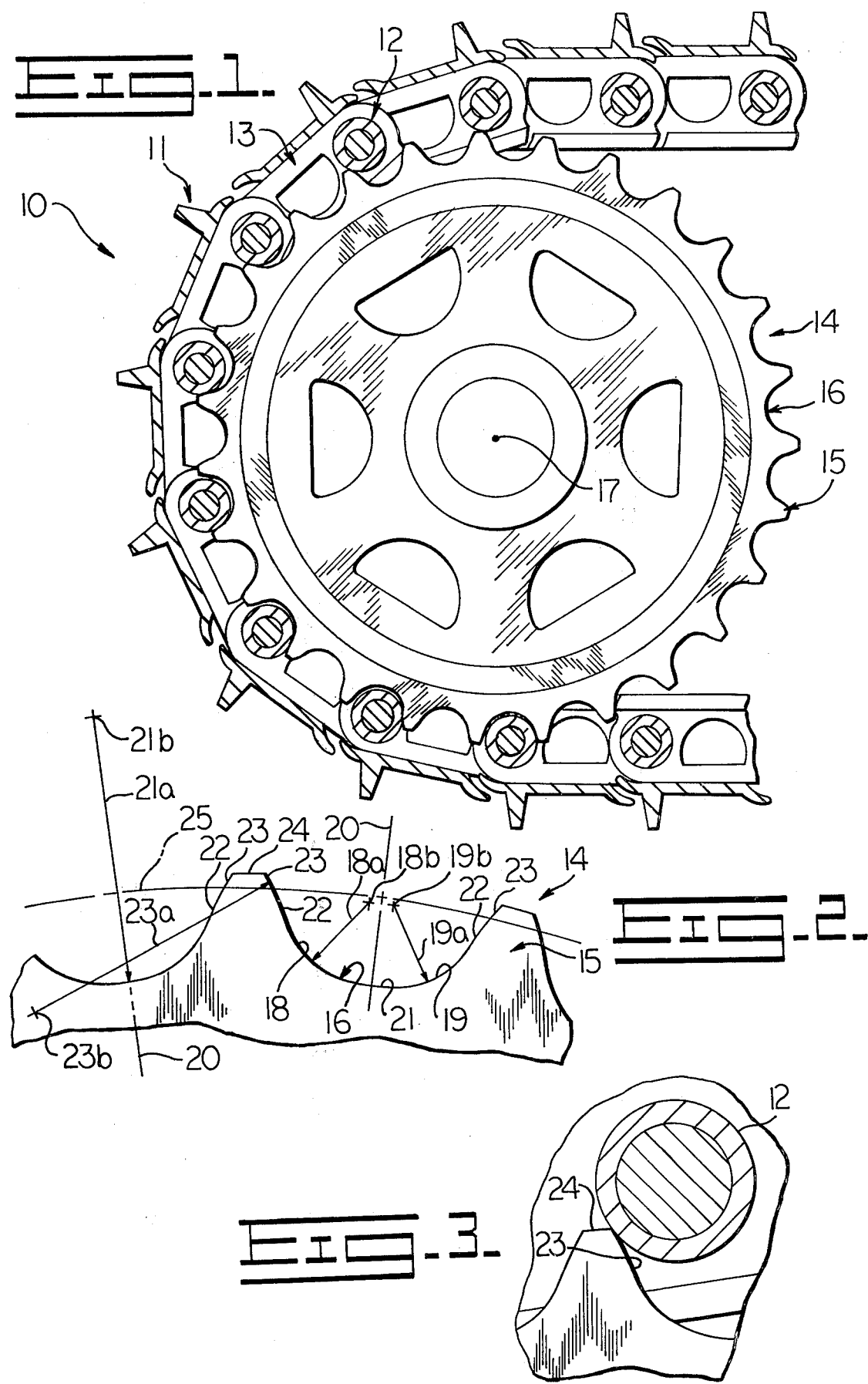

SPROCKET MEMBER CONFIGURATION

BACKGROUND OF THE INVENTION

1. Field of the Invention

This invention relates to sprocket configurations and in particular to chain drive sprocket configurations.

2. Description of the Prior Art

In vehicle chain drives, sprockets are utilized over which the chain is trained for guiding the chain in the driving operation. The sprocket defines a plurality of teeth which are engaged by the respective bushings being received in the pockets between the teeth as the chain passes in engagement with the sprocket.

In the conventional sprocket configuration, wear may occur both in the sprocket and the bushing because of accumulation of foreign matter in the pockets tending to urge the chain outwardly from the bottom of the pocket and thereby cause an elongation of the chain in the driving operation.

The outward movement of the chain relative to the pocket causes the bushings to make contact with the outer portions of the sprocket teeth. Heretofore, the sprocket teeth have had relatively sharp corners and the engagement of the bushings therewith has heretofore caused severe wear of the bushings as a result of the tooth pocket packing and resultant outward displacement of the chain.

A number of attempts have been made to solve this vexatious problem. Thus, in U.S. Pat. No. 2,667,792 of Wilfrid H. Bendall, an improved pivoted link chain drive is disclosed having a plurality of spring members engaging the link members of the chain for holding the pivot center of each link and its following drive strand on a centerline substantially tangent to the sprocket pitch circle during all phases of pivotal engagement of the link with the tooth of the sprocket. This structure is taught as reducing the sprocket engagement impact of pivoted link chains for providing improved operation over a wide speed range.

In U.S. Pat. No. 3,194,609 of Lloyd Thurlow, a tractor is shown as provided with a chain drive having a sprocket and roller-type chain. The effective sprocket pitch is taught to be less than that of the chain with the pocket radii being on the pitch line. Thus, the configuration of the Thurlow patent is directed to permitting the chain drive to operate satisfactorily as long as the pitch diameter of the chain is in the range of the pitch diameter of the sprocket to an imaginary sprocket having the same effective pitch as that of the chain.

SUMMARY OF THE INVENTION

The present invention comprehends an improved sprocket configuration for minimizing wear of the chain in normal use notwithstanding the deposition of foreign matter in the sprocket pockets tending to stretch the chain causing engagement thereof with outer portions of the sprocket teeth.

The sprocket defines an improved, relatively deep pocket configuration between the sprocket teeth to accommodate such foreign matter without affecting the chain disposition engaging the teeth in the normal operation of the chain drive.

More specifically, each pocket configuration includes opposite flank surfaces at opposite sides of the pocket radial centerline each defined by a pocket radius centered on a point spaced radially inwardly of the pitch circle at least approximately 0.05 inch and spaced circumferentially from the pocket radial centerline approximately 0.2 inch.

The pocket radius center point is spaced radially inwardly to provide a substantially deeper pocket than previously utilized in the prior art structures to effect the desired improved chain drive operation. In the specific illustrated embodiment, this point is spaced inwardly of the pitch circle approximately 0.063 inch where the pitch circle radius is approximately 20 inches.

To provide further improved chain drive operation, the sprocket teeth are provided with rounded topping surfaces. Thus, in the event the chain is displaced outwardly into engagement therewith, wear of the bushings thereof is effectively minimized.

The working surfaces between the flank surfaces and the topping surfaces may be rectilinear or arcuate, as desired, and the invention further defines an improved arrangement of the working surfaces with relationship to the flanking and topping surfaces.

The inner end of the pocket may be defined by an arcuate root surface. The root surface may be defined by a radius centered on a point above the pitch line and on the centerline of the pocket with the radius being tangent to the two pocket radii defining the flank surfaces.

Thus, the present invention comprehends an improved chain drive sprocket which is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is a fragmentary side elevation of a chain drive having an improved sprocket configuration embodying the invention;

FIG. 2 is a fragmentary enlarged elevation of a portion of the sprocket; and

FIG. 3 is a fragmentary elevation with the chain bushing shown in transverse section illustrating the association of the bushing and sprocket tooth where the chain has been stretched to permit the bushing to engage the topping surface of the tooth.

DESCRIPTION OF THE PREFERRED EMBODIMENT

In the exemplary embodiment of the invention as disclosed in the drawing, a chain drive generally designated 10 is shown to comprise a chain generally designated 11 having a plurality of bushings generally designated 12 and links generally designated 13 adapted to be entrained about a sprocket generally designated 14 defining a plurality of teeth 15 spaced apart by a corresponding plurality of pockets 16. As best seen in FIG. 1 of the drawing, chain 11 defines an effectively polygonal pitch line extending between the respective bushings. This pitch line may be varied radially from the central axis 17 of the sprocket as by the stretching of the chain during use. The chain may be stretched undesirably by the deposition of foreign matter in the pockets 16, tending to urge the chain radially outwardly from the pockets. The present invention is concerned with an improved sprocket configuration which effectively minimizes such chain stretched by accommodating foreign matter in the pockets without effecting undesirable outward stretching of the chain. The invention further comprehends an improved sprocket configuration where wear of the bushings is effectively minimized notwithstanding a displacement of the bushings outwardly into engagement with the outer portions of the teeth in the operation of the chain drive.

More specifically, as seen in FIG. 2 of the drawing, the present invention comprehends an improved configuration of sprocket 14 wherein each pocket 16 is defined by flank surfaces 18 and 19 at opposite sides of the pocket radial centerline 20. The root surface 21 of the pocket herein comprises an arcuate surface extending into each of flank surfaces 18 and 19.

Each tooth 15 is defined by a pair of working surfaces 22 extending outwardly from the flank surfaces and an outer topping surface 23 extending outwardly from the working surface to the tip 24 of the tooth. The sprocket, as shown in FIG. 1, further defines a tooth pitch circle 25.

As shown in FIG. 2, the radii 18a and 19a defining the flank surfaces 18 and 19, respectively, are respectively centered on the points 18b and 19b spaced radially inwardly of the pitch circle 25 at least approximately 0.05 inch and spaced circumferentially from the pocket radial centerline approximately 0.2 inch where the pitch circle radius is approximately 20 inches. More specifically, in the illustrated embodiment, the points 18b and 19b are spaced radially inwardly of the pitch circle approximately 0.063 inch. The radius 21a defining the root surface 21 is centered on a point 21b spaced outwardly of the pitch circle on the pocket radial centerline 20.

It has been found that, by increasing the spacing of the points 18b and 19b inwardly from the pitch circle as disclosed herein, a substantial improvement in the operation of the chain drive is effected unexpectedly. The use of the same length pocket radii 18a and 19a as in the prior art thusly provides an improved deep pocket configuration which has been found to accommodate foreign matter without causing stretching of the chain in the normal operation of the chain drive, thereby providing an improved extended life and minimization of maintenance.

The topping surfaces 23 are effectively defined by radii 23a centered on points 23b located in the adjacent tooth so as to define an arcuate, or rounded, topping surface 23 adapted to provide minimum wear relative to the bushing 12 in the event the bushing is urged outwardly to the tip portion 24 of the tooth in the operation of the chain drive for further improved long life and minimization of maintenance in the operation of the chain drive.

In the illustrated embodiment, the working surfaces 22 are rectilinear, or planar, it being understood that the surfaces may be arcuate, as desired. Where the working surfaces 22 are rectilinear, the topping surface radius 23a may be struck on a line perpendicular to the working surface.

The improved sprocket configuration permits the chain to pass freely thereabout in the normal operation of the chain drive notwithstanding accumulation of foreign matter at the root portion of the pockets. Should an excessive amount of foreign matter be retained in the pockets causing the bushings to be displaced outwardly as they pass around the sprocket, wear of the bushings is minimized as a result of the improved rounded configuration of topping surfaces 23.

Thus, the improved sprocket configuration of the present invention provides a long, troublefree chain drive life while yet being extremely simple and economical of construction.

The foregoing disclosure of specific embodiments is illustrative of the broad inventive concepts comprehended by the invention.

We claim:

1. In a chain drive sprocket member having a plurality of teeth defining a pitch circle having a radius of approximately 20 inches, an improved pocket configuration between said teeth having opposite flank surfaces at opposite sides of the pocket radial centerline each defined by a pocket radius centered on a point spaced radially inwardly of said pitch circle and spaced circumferentially from said pocket radial centerline, and an arcuate root surface defined by a radius centered on a point on said pocket radial centerline and spaced outwardly of said pitch circle.

2. The chain drive sprocket member of claim 1 wherein said point is spaced radially inwardly of the pitch circle approximately 0.063 inch.

3. The chain drive sprocket member of claim 1 wherein said root surface has opposite end portions tangent to said flank surfaces.

4. The chain drive sprocket member of claim 1 wherein the teeth are further defined by rounded topping surfaces extending to outwardly of said pitch circle.

5. The chain drive sprocket member of claim 1 wherein the teeth are further defined by working surfaces extending outwardly from said flank surfaces.

6. The chain drive sprocket member of claim 1 wherein the teeth are further defined by working surfaces extending outwardly from said flank surfaces and outer rounded topping surfaces extending outwardly from said working surfaces to outwardly of said pitch circle.

7. The chain drive sprocket member of claim 1 wherein the teeth are further defined by planar working surfaces extending outwardly from said flank surfaces.

8. The chain drive sprocket member of claim 1 wherein the teeth are further defined by arcuate working surfaces extending outwardly from said flank surfaces.

9. The chain drive sprocket member of claim 1 wherein the teeth are further defined by successive arcuate working and topping surfaces outwardly of said flank surfaces.

10. The chain-drive sprocket member of claim 1 wherein said pocket radius is centered on a point spaced radially inwardly of said pitch circle at least approximately 0.05 inch and spaced circumferentially from said pocket radial centerline approximately 0.2 inch.

* * * * *